(12) United States Patent
Tazawa et al.

(10) Patent No.: US 7,086,849 B1
(45) Date of Patent: Aug. 8, 2006

(54) METHOD FOR PRODUCING CHEMICALLY PRESTRESSED CONCRETE PRODUCT, HIGH-TEMPERATURE, HIGH-PRESSURE UNDERWATER CONCRETE PRODUCT CURING DEVICE SUITABLY USED FOR THE METHOD AND CURING METHOD FOR CONCRETE PRODUCT USING THE CURING DEVICE

(76) Inventors: Eiichi Tazawa, 2-365 Kagamiyama, Higashihiroshima-shi, Hiroshima (JP); Akihiro Hori, c/o Denki Kagaku Kogyo Kabushiki Kaisha, 2209 Oumi, Oumi-machi, Nishikubiki-gun, Niigata (JP)

( * ) Notice: Subject to any disclaimer, the term of this patent is extended or adjusted under 35 U.S.C. 154(b) by 0 days.

(21) Appl. No.: 09/701,791

(22) PCT Filed: Jun. 4, 1999

(86) PCT No.: PCT/JP99/02997

§ 371 (c)(1),
(2), (4) Date: Jan. 19, 2001

(87) PCT Pub. No.: WO99/62843

PCT Pub. Date: Dec. 9, 1999

(30) Foreign Application Priority Data

Jun. 4, 1998 (JP) .................................. 10-155687

(51) Int. Cl.
*A01J 21/00* (2006.01)
(52) U.S. Cl. ...................... 425/223; 264/234; 264/345; 264/570
(58) Field of Classification Search ................ 264/234, 264/345, 552, 570, 52, 5; 425/223
See application file for complete search history.

(56) References Cited

U.S. PATENT DOCUMENTS 4,774,045 A * 9/1988 Kushida et al. ............. 264/256

FOREIGN PATENT DOCUMENTS

| JP | 44-14834 | 7/1969 |
| JP | 51-32644 | 9/1976 |
| JP | 2-307877 | 12/1990 |
| JP | 9-351234 | 7/1999 |

OTHER PUBLICATIONS

Y. Tsuji, et al.: "Flexural Property of Chemical-Prestressed Concrete Beam Subjected to Drying-Shrinkage"; 1985; Articles in Seventh Annual Concrete Engineering Lecture Meeting, 33-36.
S. Nagataki; "Improvement of Concretes Performance"; 1997; p. 43-46.
A. Nakamura; "Recent Cements"; Concrete Products, Industry and Products No. 53, p. 42-53.

* cited by examiner

*Primary Examiner*—Chris Fiorilla
*Assistant Examiner*—Chan Sing Po
(74) *Attorney, Agent, or Firm*—SoCAL IP Law Group LLP

(57) ABSTRACT

Method of manufacturing high strength chemically prestressed concrete molding products with great amount of introduced chemical prestress and smaller loss of the same, a high temperature high pressure underwater curing apparatus concrete molding products excellent in energy efficiency, productivity and safety by re-utilizing curing water, as well as a curing method thereof are provided.

12 Claims, 3 Drawing Sheets

METHOD FOR PRODUCING CHEMICALLY PRESTRESSED CONCRETE PRODUCT, HIGH-TEMPERATURE, HIGH-PRESSURE UNDERWATER CONCRETE PRODUCT CURING DEVICE SUITABLY USED FOR THE METHOD AND CURING METHOD FOR CONCRETE PRODUCT USING THE CURING DEVICE

TECHNICAL FIELD

The present invention relates to a method of manufacturing concrete molding products introduced with chemical prestress used in the fields of the civil engineering and construction, more specifically, a method of manufacturing high strength chemically prestressed concrete molding products with great amount of introduced chemical prestress and with less loss of chemical prestressing, and a high temperature high pressure underwater curing apparatus suitable to use for curing of concrete molding products high temperature high pressure underwater curing, as well as a curing method using the apparatus.

BACKGROUND ART

At present, in concrete molding products utilized, for example, in hume pipes or box culverts, chemical prestress has been introduced by incorporation of expansive additive for improving the flexural strength thereof (Articles in Seventh Annual Concrete Engineering Lecture Meeting, pp 33–36, 1985).

However, such chemical prestress involves a subject of loss due to creep, drying shrinkage and relaxation of reinforcing bars caused of concretes with lapse of age ("Improvement of Concretes Performance" supervised by Hideyoshi Nagataki, pp 43–46, Published from Gihodo (1997)).

On the other hand, as a method of enhancing the early strength of concrete molding products, autoclave curing (high temperature, high pressure steam curing) has been known. The autoclave curing has a merit capable of obtaining a strength corresponding to about 28 day age in a case of curing underwater at about 20° C. even by curing for about two days for identical concretes and, accordingly, this has been utilized frequently at present industrially, for example, in the production of secondary concrete articles such as concrete piles. Then, since drying shrinkage after the completion of curing is reduced and creep after the completion of curing is also decreased, the autoclave curing is effective in view of the prevention of loss of chemical prestress after the curing also in a case of chemically prestressed concrete molding products.

On the contrary, however, it involves subjects that remarkable shrinkage strain is caused to the components during curing and relaxation of reinforcing bars is increased at high temperature to lose most of chemical prestress (Atsushi Nakamura, *Recent Cement, Concrete Products*, pp 42–53 Industry and Products No. 53). Therefore, autoclave curing has not been suitable to prestressed components which have to be manufactured by pretension system such as ties in rail roads.

Further, for the curing of the concrete molding products, there can be mentioned high temperature high pressure underwater curing already filed by the present applicant (Japanese Patent Application No. Hei 9-351234). In the high temperature high pressure underwater curing, the pressure in the pressure resistant vessel is increased to about 2.5 to 10 atm, curing water filled in the pressure resistant vessel is kept at a high temperature of about 130 to 180° C., and concrete components are cured being submerged in high temperature high pressure curing water.

However, in the high temperature high pressure underwater curing as described above, the inside of the autoclave apparatus has to be filled with curing water of such an amount as capable of submerging the concrete components, the curing water has to be heated to and kept at about 180° C., in addition, the inside of the pressure resistant vessel has to be depressurized by deaeration for taking out concrete molding products contained at the inside after the completion of curing and a hatch disposed in front of the pressure resistant vessel has to be opened to discharge high temperature high pressure curing water stored inside. That is, on every time concrete molding products are replaced, it is necessary that the inside of the pressure resistant vessel has to be pressurized, a great amount of curing water at high temperature is discharged, then a great amount of water is stored in turn as curing water in the autoclave apparatus and heated to a predetermined high temperature, which have consumed a great amount of water and heat energy to increase the curing cost. Further, since the curing water to be discharged is at an extremely high temperature of about 180° C. or lower, a sufficient care has to be taken for safety insurance.

DISCLOSURE OF INVENTION

This invention has been accomplished in view of the foregoing problems and one of the object thereof is to provide a method of manufacturing high strength chemically prestressed concrete molding products with a large amount of introduced chemical prestress and with smaller loss of chemical prestress.

For attaining the foregoing object, a method of manufacturing chemically prestressed concrete molding products according to one embodiment of this invention has a feature in molding concretes formed by kneading a cement composition containing a cement and an expansive additive and curing the same in a high temperature high pressure curing water at over 100° C.

This invention is to be explained more specifically.

In the manufacturing method according to this invention, the entire components are always in contact with curing water at a high temperature exceeding 100° C. during curing of chemically prestressed concrete molding products and the atmosphere is kept at high temperature and high pressure.

The curing water at high temperature is water at a temperature in excess of 100° C., preferably, 120 to 200° C. and, more preferably, 140 to 180° C. At 100° C. or lower, chemically prestressed components with less loss of chemical prestress may not be obtained and, if it exceeds 200° C., this is not preferred with an economical point of view although.

The high temperature high pressure curing water used in this invention can be prepared by placing water under high temperature and high pressure and, accordingly, an airtight pressure vessel is necessary upon production of chemically prestressed components with at high temperature high pressure curing water.

So long as the pressure resistant vessel has airtightness, the material is not particularly restricted and existent pressure container used for the autoclave apparatus can also be used.

However, since the pressure vessel such as a pressure container used as the autoclave apparatus is usually in a horizontal type, it may be considered that curing water at high temperature may be discharged upon opening the hatch after the completion the curing, so that it is preferred, for example, to fill a vertical type pressure vessel with high temperature curing water and the components are cured being submerged therein.

The cement composition used in the manufacturing method according to this invention contains a cement and an expansive additive.

As the cements, various portland cements such as of ordinary, low temperature, high-early-strength and ultra high-early-strength portland cements, various kinds of mixed cements formed by mixing the portland cements with silica, blast furnace slags or fly ashes can be used.

Furthermore, those formed by blending the portland cement with silica, blast furnace slags or fly ashes in excess of a mixing ratio specified according to JIS or the like may also be used. Cements formed by mixing active silica such as silica fume or baked products or not baked products of clay minerals such as meta-kaoline can also be used.

As the expansive additive used in the manufacturing method according to this invention, haüynite series or calcium oxide series expansive mixtures can be used.

The amount of the expansive additive to be used is preferably from 2 to 16 parts by weight and, more preferably, from 4 to 12 parts by weight based on 100 parts by weight of the cement. If it is less than 2 parts by weight, the effect of this invention may not possibly be obtained and, if it exceeds 16 parts by weight, excess expansion is caused to result in a worry of expansion destruction.

The kind and the amount of aggregates used in the manufacturing method according to this invention are not particularly restricted and those usually used in the field of concretes can be used.

Further, water is not particularly restricted as well and those used in the field of concretes usually can be used.

The materials described above are kneaded by a usual method, charged in a mold form and then molded.

The time for previously placing the components after molding till the curing of this invention (pre-placing time) has no particular restriction so long as it is after the age which allows the chemically prestressed components to be removed from the form.

There is no particular restriction for the temperature elevation time for heating water to high temperature has no particular restriction but it is preferably about from 1 to 5 hours and, more preferably, at about 3 hours.

The time for keeping a highest temperature after reaching this invention (retention time) has no restriction and it is preferably from 1 to 8 hours and, more preferably, about 2 to 5 hours.

Further, the time for subsequently cooling to normal temperature (cooling time) has no particular restriction so long as it is sufficient to cool the chemically prestressed components to the normal temperature.

Another object of this invention is to provide a high temperature high pressure underwater curing apparatus for concrete molding products excellent in the energy efficiency and safety capable of re-utilizing high temperature high pressure curing water without discarding the same wastefully, as well as method of curing concrete molding products by using the curing apparatus described above.

For attaining the foregoing object, in a curing apparatus according to one embodiment of this invention, a high temperature high pressure underwater curing apparatus for curing concrete molding products in high temperature high pressure curing water sealed in the pressure resistant vessel is constituted as described below.

That is, the high temperature high pressure underwater curing apparatus for concrete molding products comprises a plurality of openable/closable pressure resistant vessels for containing concrete molding products, in which a curing water supply device for supplying water or warmed water as curing water to the inside of the vessel, a pressurized air supply device for supplying pressurized air to the inside of the vessel thereby pressurizing the inside curing water, a heater for heating the curing water supplied to the inside of the vessel and maintaining the same at a predetermined temperature and a deaeration valve disposed to an upper portion of the vessel for opening the inside to atmospheric air are disposed to each of the pressure resistant vessels, a transfer pipe is disposed to a lower portion thereof being connected to an optional portion of other pressure resistant vessel for delivering curing water in communication with other pressure resistant vessel by way of an ON/OFF valve, and a transfer pipe is disposed to the optional portion being connected to the lower portion of other pressure resistant vessel and receiving curing water in communication with the other pressure resistant vessel by way of an ON/OFF valve, in which respective pressure resistant vessels are connected by the two transfer pipes so as to form a circulation channel to each other.

In this embodiment, the transfer pipe on the side of receiving the curing water is desirably situated to the upper portion of each of the pressure resistant vessels.

Further, for attaining the foregoing object, a curing method according to an embodiment of this invention provides a method of curing concrete molding products using the high temperature high pressure underwater curing apparatus for concrete molding products described above, which comprises a curing step of filling the inside of the pressure resistant vessel with curing water, keeping the curing water at a predetermined high temperature by the heater and supplying pressurized air from the pressurized air supply device to put the inside of the pressure resistant vessel to a high pressure and curing concrete molding products contained in the vessel for a predetermined period of time, a transfer step for curing water of opening an ON/OFF valve of the transfer pipe on the delivery side of the pressure resistant vessel, transferring high temperature high pressure curing water filled inside of the pressure resistant vessel through a transfer pipe on the delivery side to other pressure resistant vessel and closing the ON/OFF valve of the transfer pipe on the delivery side after the completion of transfer of the curing water and a stand-by step of taking out the concrete molding products after curing from the inside after the completion of the transfer step, replacing the same with concrete molding products before curing and waiting for reception of curing water from other pressure resistant vessel, in which each of the steps is repeated successively on each of the pressure resistant vessels in shifts and concrete molding product are cured while transferring the curing water to a plurality of the pressure resistant vessels connected so as to form a circulation channel.

In the step of transferring the curing water, it is preferred that the inside of the other pressure resistant vessel is opened to the atmospheric air by the deaeration device thereof.

Furthermore, in the step of transferring the curing water, it is preferred to supply pressurized air from the pressurized air supply unit for the pressure resistant vessel in which the curing step has been completed thereby forcively transferring the curing water remaining inside to the other pressure resistant vessel.

The curing apparatus and the curing method are applicable to the curing of concrete molding products irrespective of the introduction of chemical prestress.

In the high temperature high pressure underwater curing apparatus for the concrete molding products and the curing method using the apparatus according to this invention having the foregoing constitution, since each of the pressure resistant vessels is connected with other pressure resistant vessel such that the transfer pipe on the delivery side and the transfer pipe on the receiving side for the curing water are connected by way of the ON-OFF valve so as to form a circulation channel to each other, each of the pressure resistant vessels can be used as the curing apparatus independent of each other by closing all the ON-OFF valves, as well as two pressure resistant vessels connected with the transfer pipe for curing water can be in communication by opening the ON-OFF valve between them. That is, by adapting such that one of the two pressure resistant vessels constitutes a pressure resistant vessel after the completion of the curing step while the other of them constitutes a pressure resistant vessel in the stand-by step containing new concrete molding products, the high temperature high pressure curing water stored inside of one of the pressure resistant vessels can be easily transferred into the other pressure resistant vessel at normal pressure by merely opening the ON-OFF valve. Accordingly, since the curing water once used can be re-used repeatedly while transferring circulatorily between each of a plurality of pressure resistant vessels, there is no requirement for preparing high temperature high pressure curing water on every replacement of concrete molding products and fill the same to the inside of the pressure resistant vessel, so that a great amount of water can be saved, labor for heating and heat energy therefor can also be reduced greatly to thereby conduct highly efficient curing and reduce the curing cost for the concrete molding products as much as possible.

Further, when high temperature high pressure curing water which is dangerous to handle with is transferred from one of the pressure resistant vessels completed for curing step to the other pressure resistant vessels in the stand-by stage, the high temperature high pressure curing water can be transferred till it reaches an equilibrium pressure as it is stored in the closed apparatus merely by the operation of opening the ON/OFF valve disposed in the midway of the transfer pipe for curing water connecting both of the pressure resistant vessels and, further, since the high temperature high pressure curing water is not discharged to the outside, operation safety can be improved outstandingly.

Further, when the high temperature high pressure curing water used repeatedly is transferred, the high temperature high pressure curing water can be transferred by simply opening the ON/OFF valve of the transfer pipe from the inside of the pressure resistant vessel after the completion of the curing step into the pressure resistant vessel at a normal pressure in the stand-by step till the inner pressure between them reaches an equilibrium state and, further, the curing water remaining in the pressure resistant vessel on the delivery side after the completion of the curing step can be easily transferred substantially for the entire amount by supplying pressurized air from the pressurized air supply device disposed to the pressure resistant vessel after the completion of the curing into the inside thereof and opening the deaeration valve disposed to the other pressure resistant vessels in the stand-by step. In this case, when the transfer pipe is connected to an upper portion of the pressure vessel on the receiving side to which the pipe is connected, the curing water can be transferred to the inside of the pressure resistant vessel on the receiving side being free from the effect of the pressure due to the weight of the transferred curing water, which can mitigate the load on the pressurized air supply device of the pressure resistant vessel on the delivery side and shorten the transfer time.

That is, according to the curing apparatus of this invention, most of curing water can be transferred by utilizing the pressure difference between the two pressure resistant vessels with no additional provision of a device for transferring high temperature high pressure curing water and the amount of the curing water transferred depending on the pressurized air supply device can be reduced by applying the opening operation for the deaeration valve in the pressure resistant vessel on the receiving side, thereby capable of shortening the operation time for the pressurized air supply device and curing water can be transfer efficiently while reducing the consumption energy of the pressurized air supply device.

Furthermore, since a high temperature high pressure underwater curing apparatus consisting only of a single pressure resistant vessel is also provided with a water supply device, a deaeration device and a pressurized air supply device respectively by way of ON/OFF valves, and further has a heater for elevating or keeping the water temperature of the curing water in view of the function, the apparatus can be constituted with a simple structure of using a plurality of such existent pressure resistant vessels and connecting them by way of ON/OFF valves so as to form circulation channels to each other by transfer pipes for curing water, the high temperature high pressure underwater curing apparatus according to this invention can be obtained at an extremely reduced cost and easily with no enormous installation investment.

Furthermore, when at least one of the plurality of pressure resistant vessels connected by the transfer pipes so as to form circulation channel to each other is always put in a stand-by state not filled with the high temperature high pressure curing water in the pressure resistant vessel and the steps for respective pressure resistant vessels are shifted, curing can be repeated by transferring high temperature high pressure curing water in the pressure resistant vessel, after the completion of the curing step successively to the pressure resistant vessel in the stand-by step, curing operation can be conducted at an extremely high efficiency in view of both energy and time by greatly saving the loss of the heat energy.

BEST MODE FOR CARRYING OUT THE INVENTION

Figure 1:
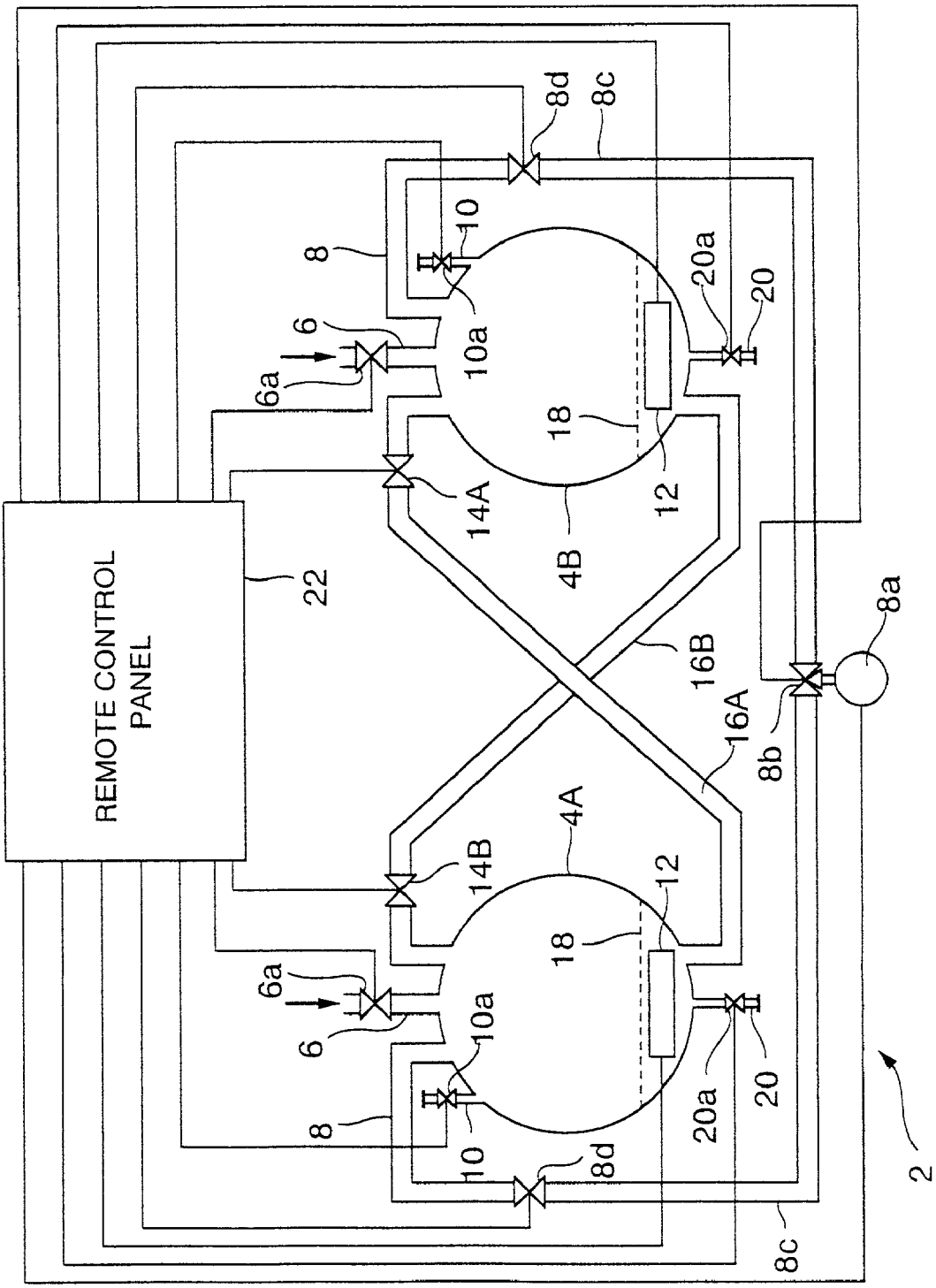
FIG. 1 is a constitutional model view illustrating a first embodiment of a high temperature high pressure underwater curing apparatus for concrete molding products according to this invention.
Figure 2:
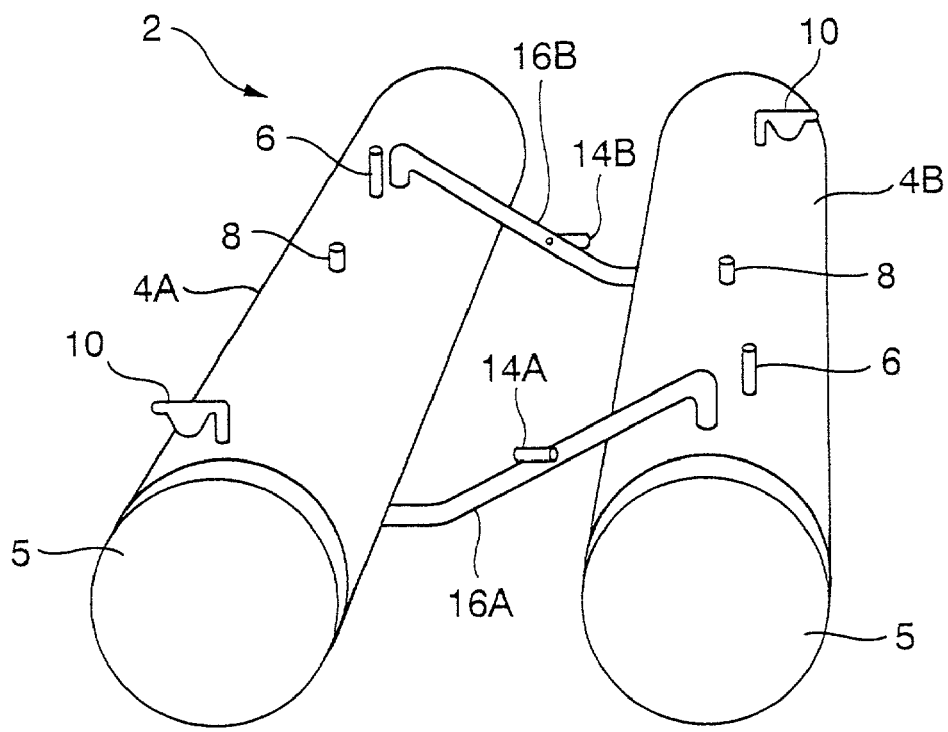
FIG. 2 is a perspective view illustrating a first embodiment of a high temperature high pressure underwater curing apparatus for concrete molding products according to this invention.
Figure 3:
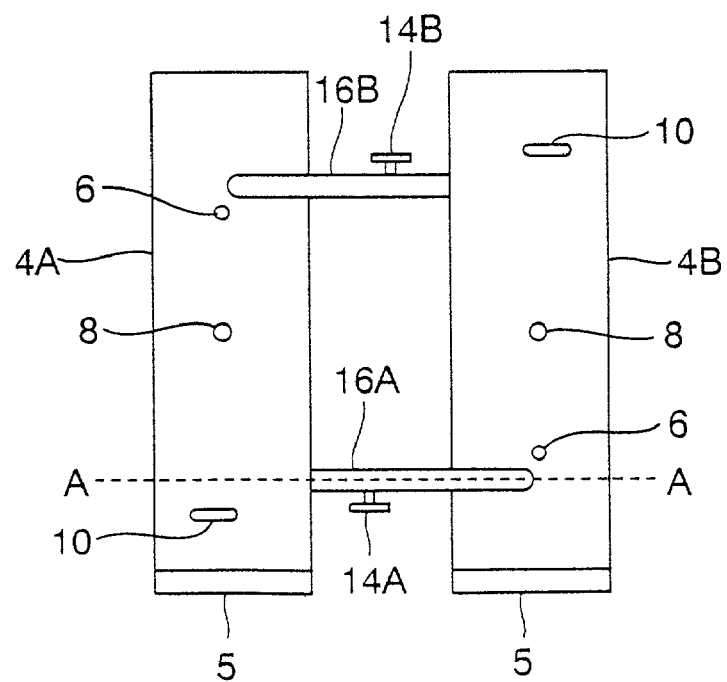
FIG. 3 is a plan view illustrating a first embodiment of a high temperature high pressure underwater curing apparatus for concrete molding products according to this invention.
Figure 4:
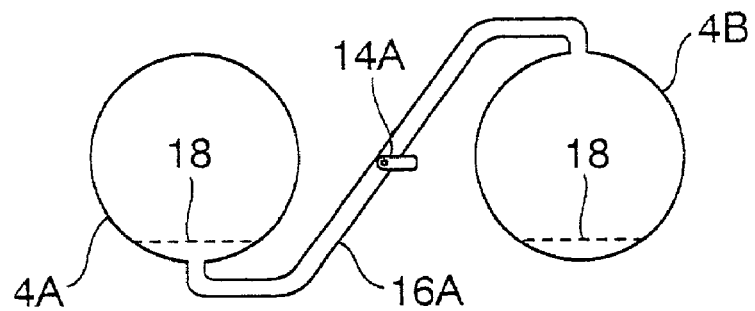
FIG. 4 is a cross sectional view taken along line A—A in FIG. 3.

Method of manufacturing chemically prestressed concrete molding products according to this invention is to be described in detail by way of experimental examples.

Experimental Example 1

Concretes were prepared by using concrete formulations at 35% of water/(cement+expansive additive) ratio (W/B), 42% of fine aggregate ratio (S/a), comprising cement and expansive additive in the amounts shown in Table 1, 684 kg/m$^3$ of fine aggregates, 946 kg/m$^3$ of coarse aggregates, 173 kg/m$^3$ of water and 6.38 kg/m$^3$ of dewatering agent and, after removing forms at one day age, cured in high temperature high pressure curing water of 180° C. and 10 atm for 5 hours, the change of the length in the restrained state of cured products was measured to calculate chemical prestress and the flexural strength and the compressive strength were measured. The results are shown together in Table 1.

For comparison, autoclave curing at 180° C. and 10 atm for five hours after removing forms at one day age and normal temperature underwater curing at 20° C. and 1 atm for 48 hours after removing forms at one day age were conducted in the same manner.

<Materials Used>

Cement: Ordinary portland cement, specific gravity: 3.16, blaine value: 3220 cm$^2$/g Expansive additive a: calcium oxide, commercial products, blaine value: 3100 cm$^2$/g Expansive additive b: haüynite expansive additive, commercial products, blaine value: 2950 cm$^2$/g Expansive additive c: haüynite expansive additive, CaCO$_3$, Al$_2$O$_3$ and CaSO$_4$ of first grade reagent were blended so as to provide 6.5 to 18 of CaO/Al$_2$O$_3$ molar ratio and 1.5 to 4 CaSO$_4$/Al$_2$O$_3$ molar ratio, sintered in an electric furnace at 1350° C. for one hour and the resultant clinker was adjusted to a blaine value: 3000±200 cm$^2$/g Fine aggregates: weathered granitic pit sand, specific gravity: 2.56, water absorption: 1.87, coarse grain ratio: 2.45

Coarse aggregates: crushed rhyolitic stone, specific gravity: 2.67, water absorption 1.20, coarse grain ratio: 7.19, maximum aggregate size of 20 mm Dewatering agent: polycarboxilic polymeric surfactant, commercial products <Measuring Method>

Length Changing Coefficient:

The length just before curing (one day age) and just after the completion of cooling time (3 day age) were measured under a restrained state and at a constant condition of 20° C. in accordance with JIS A 6202-1980 "Expansive Additive for Concrete," Reference 1 "Method of Test for Restrained Expansion and Shrinkage of Expansive Concrete, B Method", the difference was defined as the change of length, and a value obtained by dividing the change of the length with 385 mm as the measuring distance was defined as the length changing coefficient.

Chemical Prestress:

Calculated according to the equation $$\sigma = \epsilon E_s (A_s/A_c)$$

in which $\sigma$ denotes chemical prestress, $\epsilon$ denotes strain of a concrete component measured by the measuring method for the length changing coefficient (=length changing coefficient), Es denotes a modulus of elasticity of steel material of $2.06 \times 10^5$ N/mm$^2$, As denotes a cross sectional area of the steel material of $1.1 \times 10^2$ mm$^2$ and Ac denotes a cross sectional area of concrete components of $99 \times 10^2$ mm$^2$).

Flexural Strength:

Test specimens were prepared in accordance with JIS A 6202-1980 "Concrete Expansive Additive", Reference 1 "Method of Test for Restrained Expansion and Shrinkage of Expansive Concrete, B Method", which were separated from forms at one day age and then cured respectively. The flexural strength was measured at 3 days age in accordance with JIS A 1106 "Method of Test for Flexural Strength of Concrete" and, curing was conducted at a temperature of 20° C. and a humidity of 50% RH after the curing each of them to measure the flexural strength at 28 days age.

Compressive Strength:

The specimens were separated from forms at one day age after molding and the compressive strength was measured at 3 days age according to JIS A 1108 "Method of Test for Compressive Strength for Concrete".

TABLE 1

| Experiment No. | Cement | Expansive additive | Curing condition | Length changing coefficient ($\times 10^{-6}$) | Chemical prestress | Flexural strength 3 day | Flexural strength 28 day | Compressive strength | Note |
|---|---|---|---|---|---|---|---|---|---|
| 1-1 | 495 | —0 | in high temperature water | +25 | 0.057 | 6.68 | 6.48 | 57.5 | Comp. Example |
| 1-2 | 475 | a20 | in high temperature water | +380 | 0.870 | 8.24 | 8.12 | 58.6 | Example |
| 1-3 | 445 | b50 | in high temperature water | +400 | 0.916 | 7.12 | 7.05 | 53.4 | Example |
| 1-4 | 475 | c20 | in high temperature water | +1500 | 3.43 | 8.99 | 9.01 | 54.2 | Example |
| 1-5 | 475 | a20 | autoclave | +105 | 0.240 | 6.88 | 6.85 | 57.6 | Comp. Example |

TABLE 1-continued

| Experiment No. | Cement | Expansive additive | Curing condition | Length changing coefficient (x10⁻⁶) | Chemical prestress | Flexural strength 3 day | Flexural strength 28 day | Compressive strength | Note |
|---|---|---|---|---|---|---|---|---|---|
| 1-6 | 445 | b50 | " | +230 | 0.526 | 6.42 | 6.18 | 51.2 | " |
| 1-7 | 475 | c20 | " | +350 | 0.801 | 7.69 | 7.72 | 43.5 | " |
| 1-8 | 475 | a20 | in normal temperature water | +204 | 0.467 | 3.69 | 7.16 | 19.2 | Comp. Example |
| 1-9 | 445 | b50 | in normal temperature water | +262 | 0.600 | 4.25 | 6.34 | 21.3 | " |
| 1-10 | 475 | c20 | in normal temperature water | +284 | 0.650 | 3.85 | 7.95 | 20.4 | " |

Cement and expansive additive are on (kg/m³), chemical prestress, flexural strength and compressive strength are on (N/mm²)

It can be seen from the table that a great amount of chemical prestress is introduced according to this invention to improve the flexural strength by using the manufacturing method and that compressive strength is developed at an early stage.

As apparent from the table, the expansion strain introduced to the chemically prestressed component is scarcely reduced for a long period of time even under drying shrinkage, and this indicates that the loss of the introduced chemical prestress is extremely small.

Experimental Example 2

The procedures were the same as in Experimental Example 1 except for curing under the condition at a temperature of 20° C. and a humidity of 50% RH after the completion of curing shown in Table 2, and measuring the length changing coefficient as shown in Table 2 starting with 3 days age. The results are shown together in Table 2

Experimental Example 3

Procedures were identical with those in Experimental Example 1 except for conducting high temperature underwater curing by blending the expansive additive b shown in Table 3 to 100 parts by weight of cement. The results are shown together in Table 3.

TABLE 2

| Experiment No. | Cement | Expansive additive | Curing condition | Length changing coefficient (x10⁻⁴) 4 days | 25 days | 88 days | Note |
|---|---|---|---|---|---|---|---|
| 2-1 | 475 | a20 | in high temperature water | −3 | −26 | −38 | Example |
| 2-2 | 445 | b50 | in high temperature water | −12 | −71 | −85 | " |
| 2-3 | 475 | c20 | in high temperature water | −4 | −29 | −40 | " |
| 2-4 | 475 | a20 | autoclave | −8 | −38 | −46 | Comp. Example |
| 2-5 | 445 | b50 | " | −25 | −80 | −95 | " |
| 2-6 | 475 | c20 | " | −13 | −68 | −75 | " |
| 2-7 | 475 | a20 | in normal temperature water | −200 | −486 | −526 | Comp. Example |
| 2-8 | 445 | b50 | in normal temperature water | −86 | −315 | −336 | " |
| 2-9 | 475 | c20 | in normal temperature water | −386 | −543 | −568 | " |

Cement and expansive additive are on the basis of (kg/m³)

TABLE 3

| Experiment No. | Expansive additive | Length changing coefficient (x10⁻⁶) | Chemical stress | Flexural strength | Compressive strength | Note |
|---|---|---|---|---|---|---|
| 1-1 | 0 | +25 | 0.057 | 6.48 | 57.5 | Comp. Example |
| 3-1 | 2 | +103 | 0.236 | 6.82 | 57.3 | Example |
| 3-2 | 4 | +220 | 0.504 | 6.88 | 55.2 | " |

TABLE 3-continued

| Experiment No. | Expansive additive | Length changing coefficient (x10⁻⁶) | Chemical stress | Flexural strength | Compressive strength | Note |
|---|---|---|---|---|---|---|
| 3-3 | 8 | +348 | 0.797 | 6.99 | 54.6 | " |
| 3-4 | 12 | +1523 | 3.49 | 7.11 | 51.5 | " |
| 3-5 | 16 | +1960 | 4.49 | 6.75 | 48.2 | " |

The expansive additive is based on (parts by weight) to 100 parts by weight of cement, chemical prestress, flexural strength and compressive strength are based on (N/mm²).

As apparent from the table, the expansion strain increases as the mixing amount of the expansive additive increases. However, if the mixing amount of the expansive additive is excessive, the flexural stress is lowered.

Experimental Example 4

Procedures were conducted in the same manner as in Experimental Example 1 except for using the cement and the expansive additive shown in Table 4, conducting curing at curing temperature and for curing time shown in Table 4 and measuring the length changing coefficient and the compressive strength. The results are shown together in Table 4.

TABLE 4

| Experiment No. | Cement | Expansive additive | Curing condition | Curing temp. (° C.) | Retention time (H) | Length changing coefficient (x10⁻⁶) | Compressive strength | Note |
|---|---|---|---|---|---|---|---|---|
| 4-1 | 430 | a30 | in high temperature water | 160 | 2 | +440 | 50.1 | Example |
| 4-2 | 410 | b50 | in high temperature water | 160 | 2 | +1250 | 40.9 | " |
| 4-3 | 440 | c20 | in high temperature water | 160 | 2 | +850 | 41.9 | " |
| 4-4 | 430 | a30 | in high temperature water | 180 | 6 | +400 | 49.5 | Example |
| 4-5 | 410 | b50 | in high temperature water | 180 | 6 | +880 | 46.5 | " |
| 4-6 | 440 | c20 | in high temperature water | 180 | 6 | +680 | 46.4 | " |
| 4-7 | 430 | a30 | autoclave | 180 | 6 | +170 | 35.5 | Comp. Example |
| 4-8 | 410 | b50 | " | 180 | 6 | +220 | 26.1 | " |
| 4-9 | 440 | c20 | " | 180 | 6 | +370 | 30.5 | " |
| 4-10 | 410 | b50 | in high temperature water | 105 | 4 | +520 | 33.6 | Example |
| 4-11 | 410 | b50 | in high temperature water | 120 | 4 | +780 | 39.6 | " |
| 4-12 | 410 | b50 | in high temperature water | 140 | 4 | +975 | 43.4 | " |
| 4-13 | 410 | b50 | in high temperature water | 160 | 4 | +1350 | 50.5 | " |
| 4-14 | 410 | b50 | in high temperature water | 180 | 4 | +1100 | 47.2 | " |
| 4-15 | 410 | b50 | in high temperature water | 200 | 4 | +965 | 41.8 | " |
| 4-16 | 410 | b50 | in high temperature water | 160 | 1 | +825 | 38.6 | Example |
| 4-17 | 410 | b50 | in high temperature water | 160 | 2 | +1250 | 40.9 | " |
| 4-13 | 410 | b50 | in high temperature water | 160 | 4 | +1350 | 50.5 | " |
| 4-18 | 410 | b50 | in high temperature water | 160 | 5 | +1280 | 48.6 | " |
| 4-19 | 410 | b50 | in high temperature water | 160 | 8 | +1040 | 40.6 | " |

Cement and expansive additive are based on (kg/m³), compressive strength is based on (N/mm²)

From the table, it can be apparent that larger expansion strain and higher compressive strength can be obtained compared with existent autoclave curing at 180° C. and 10 atm, by conducting high temperature underwater curing at a curing temperature in excess of 100° C.

Further, it is apparent that the curing temperature is preferably from 120 to 200° C. and the maximum expansion strain and compressive strength can be obtained at 160° C. in a case where the retention time is constant.

Further, it is apparent that great expansion strain and compressive strength can be obtained for a retention time of 2 to 5 hours in a case where the curing temperature is constant.

Then, a preferred embodiment of a high temperature high pressure underwater curing apparatus according to this invention is to be explained in detail with reference to appended FIG. 1 to FIG. 4. In this embodiment, descriptions are to be made to an example of an embodiment using two pressure resistant vessels as a minimum unit for the high temperature high pressure underwater curing apparatus according to this invention for the convenience of explanation.

As is illustrated, a high temperature high pressure underwater curing apparatus 2 according to this invention comprises two cylindrical pressure resistant vessels 4A and 4B each having a closed space defined at the inside for containing concrete molding products and having an openable/closable hatch 5 at a frontal portion. Each of the pressure resistant vessels 4A and 4B comprises, at an upper portion thereof, a curing water supply device 6 for supplying water or warmed water as curing water to the inside thereof, a pressurized air supply device 8 for supplying pressurized air and a deaeration device 10 for opening the inside of the vessel to an atmospheric air for depressurization and, further, has a heater 12 disposed at the inside of each of the pressure resistant vessels 4 for heating the water or curing water supplied to the inside keeping it at a predetermined temperature. The pressurized air supply device 8 is adapted to switchingly supply pressurized air from a common compressor 8a by way of a switching valve 8b to each of the pressure resistant vessels 4A and 4B individually, and an ON/OFF valve 8d is disposed to a supply pipeline 8c connecting each of the pressure resistant vessels 4A, 4B from the switching valve 8b respectively. Further, an ON/OFF valve 6a and a deaeration valve 10a are disposed respectively to the curing water supply device 6 and the deaeration device 10, respectively.

By the way, a transfer pipe 16A is disposed to the lower portion of one pressure resistant vessel 4A, which is in communication by way of an ON/OFF valve 14A in the midway with the upper portion of the other pressure resistant vessel 4B and, further, a transfer pipe 16B is disposed in the upper portion of the pressure resistant vessel 4A which is in communication with an ON/OFF valve 14B in the midway with the lower portion of the other pressure resistant vessel 4B, by which two pressure resistant vessels 4A and 4B are connected to each other by way of the two transfer pipes 16A and 16B so as to form a circulation channel.

Further, a screen member 18 constituting a strainer is disposed in each of the pressure resistant vessels 4A and 4B covering the area above the communication portions with the transfer pipes 16A and 16B on the delivery side connected therewith for preventing fractures of concretes from flowing into the transfer pipes 16A and 16B by the screen member 18. Further, a water drain pipe 20 and an ON/OFF valve 20a thereof are disposed at the lowermost end of each of the pressure resistant vessels 4A and 4B used for cleaning.

Further, the ON/OFF valve 6a for the curing water supply device 6, the aeration valve 10a for the deaeration device 10, the heater 12, the compressor 8a, the switching valve 8b for the pressurized air supply device 8 and the ON/OFF valve 8d therefor are adapted to be remote controlled electrically for operation by a remote control panel 22.

Then, the method of curing concrete molding products by using the high temperature high pressure underwater curing apparatus 2 to be explained.

At first, a start preparation step in a case of conducting high temperature high pressure underwater curing, for example, by the pressure resistant vessel 4A is to be explained. In the start preparation step, concrete molding products for curing are contained and disposed in the pressure resistant vessel 4A, and the ON/OFF valves 14A and 14B for the two transfer pipe 16A and 16B for curing water, as well as all ON/OFF valves in the pipeline system in communication with the pressure resistant vessel 4A, namely, the ON/OFF valve 6a of the curing water supply device 6, the ON/OFF valve 8d for the pressurized air supply device 8, the deaeration valve 10a for the deaeration device 10 and the water drain valve 20 are closed, and the hatch 5 for the pressure resistant vessel 4A is closed to completely seal the inside thereof. Then, a predetermine amount of water or warmed water is supplied as the curing water to the inside of the pressure resistant vessel 4A by the ON/OFF operation to the ON/OFF valve 6a of the curing water supply device 6 in the pressure resistant vessel 4A. The start preparation step is as has been described above.

When the start preparation step has been completed, the pressure resistant vessel 4A goes to the curing step. In the curing step, water or warmed water stored inside as curing water is heated by the heater 12 disposed in the pressure resistant vessel 4A to a predetermined temperature in excess of 100° C., preferably, to a temperature within a range about from 130 to 180° C., and the compressor 8a, the switching valve 8b and ON/OFF valve 8d for the pressurized air supply device 8 are operated to supply the pressurized air pressurized by the compressor 8a into the pressure resistant vessel 4A by operating the ON/OFF valve 8d to increase the internal pressure to a value higher than 1 atm, preferably, to about 2.5 to 10 atm, by which the curing water is pressurized to a high pressure and the heater 12 is operated intermittently so as to keep the temperature at the predetermined temperature, and the concrete molding products were cured till lapse of a predetermined period of time in high temperature high pressure curing water. The curing time is usually about five hours.

Then, when the curing step in the pressure resistant vessel 4A has been completed, it goes to the curing water replacing step at high temperature and high pressure. In the replacing step, the deaeration valve 10a of the deaeration device 10 in the pressure resistant vessel 4B in which the concrete molding products before aging in the stand-by state are contained and arranged is opened to render the inside to an atmospheric condition, the valves other than the above are closed, and the ON/OFF valve 14A of the transfer pipe 16A on the delivery side in the pressure resistant vessel 4A is opened. Then, the high temperature high pressure curing water in the pressure resistant vessel 4A completed for the curing step flows through the transfer pipe 16A into the other pressure resistant vessel 4B now at an atmospheric pressure, and the curing water flows from the pressure resistant vessel 4A to the pressure resistant vessel 4B till the inner pressure for both of the pressure resistant vessels 4A and 4B substantially reach an equilibrium state (more accurately, since the inside of the pressure resistant vessel 4B is opened to atmospheric air, till the pressure in the pressure resistant vessel 4A, is balanced with the water head pressure of the transfer pipe 16A).

Subsequently, the pressure in the pressure resistant vessel 4A is increased by the pressurized air supply device 8 of the pressure resistant vessel 4A on the side of completing the curing step to transfer the curing water remaining at the inside into the pressure resistant vessel 4B on the side of the stand-by step. When substantially the entire amount of curing water has been transferred, the operation of the compressor 8a for the pressurized air supply device 8 is stopped, the ON/OFF valve 8d therefor is closed and the ON/OFF valve 14A of the transfer pipe 16A is closed and, further, the deaeration valve 10a for the deaeration device 10 of the pressure resistant vessel 4B is also closed to complete the step of transferring the high temperature high pressure curing water in the pressure resistant vessel 4A.

Then, while the pressure resistant vessel 4A completed for the transfer step of the curing water goes to the next stand-by step, the pressure resistant vessel 4B having received the curing water goes to the curing step. In this embodiment, the curing step in the pressure resistant vessel 4B is identical with the curing step described above. In a case where the amount of the curing water is insufficient, it can be supplemented with water or warm water properly from the curing water supply device 6.

In the stand-by step, when the pressurized air is remained in the pressure resistant vessel 4A, the deaeration valve 10a for the pressure resistant vessel 4A is at first opened to release the remaining pressurized air to atmospheric air. Subsequently, if necessary, the concrete molding products after the curing contained inside are taken out by opening the hatch 5 for the pressure resistant vessel 4A after optionally lowering the temperature of the pressure resistant vessel 4A and then the concrete molding products to be cured next are contained and arranged at the inside thereof. Then, after confirming that all the valves 6a, 8d, 10a, 14A, 14B and 20a in the pipeline system in communication with the inside of the pressure resistant vessel 4A have been closed, the hatch 5 of the pressure resistant vessel 4A is closed, completion of the curing step in the pressure resistant vessel 4B is waited and, after the completion of the curing step, it goes to the step for transferring the high temperature high pressure curing water after completion of the curing step.

Subsequently, the curing step, the transfer step and the stand-by step are repeated successively on every pressure resistant vessel 4A, 4B as described above and underwater curing at high temperature and high pressure is repeated by continuously using the curing water while transferring the high temperature high pressure curing water alternately between the two pressure resistant vessels 4A and 4B.

As described above, since curing water once heated to a high temperature can be re-used repeatedly by transferring successively between both of the pressure resistant vessels 4A and 4B to each other, it is no more necessary to replace curing water with new water on every replacement of concrete molding products and heat the water from a low temperature by the heater 12 or the like, so that a great amount of water can be saved and the labor for heating and heat energy required for heating can be reduced greatly compared with a case of replacing and heating water on every time and curing can be conducted at a high efficiency both in view of time and heat, thereby enabling to remarkably reduce the production cost of the concrete molding products. Furthermore, since the curing water at high temperature requiring a sufficient safety care in view of handling can be retained in a closed apparatus comprising the two pressure resistant vessels 4A and 4B and the two transfer pipes 16A and 16B for connecting them, operators' safety can be improved outstandingly.

That is, according to the curing apparatus of this invention, since the most portion of the curing water is transferred by utilizing the difference of pressure between the pressure resistant vessels 4A and 4B with no particular provision of a device for transferring high temperature high pressure curing water, the curing water can be easily transferred between both of the pressure resistant vessels 4A and 4B, the amount of curing water that has to be transferred by the pressurized air supply device 8 is decreased and the operation time of the pressurized air supply device 8 can also be shortened and the power energy required for the operation also be reduced thereby enabling to transfer the curing water efficiently. Then, the above-mentioned effects become more remarkable by opening the deaeration valve 10a of the pressure resistant vessel in the stand-by step on the receiving side. In addition, since the opened deaeration valve 10a forms an air vent hole, no excess load is exerted on the pressurized air supply device 8 and the pressure resistant vessels 4A and 4B, as well as the transfer pipes 16A and 16B, it is also possible to prevent degradation or damage of the apparatus.

Further, since the high temperature high pressure underwater curing apparatus comprising a single pressure resistant vessel also comprises a water supply device, a deaeration device and a pressurized air supply device by way of each of ON/OFF valves respectively in view of the function, and also has a heater for elevating or keeping the temperature of curing water in the pressure resistant vessel, the high temperature high pressure underwater curing apparatus 2 of this invention can be obtained at an extremely reduced cost and easily with no enormous installation investment by a simple modification of using two of such pressure resistant vessels and connecting them with two transfer pipes 16A and 16B by way of the ON/OFF valves 14A and 14B.

Figure 5:
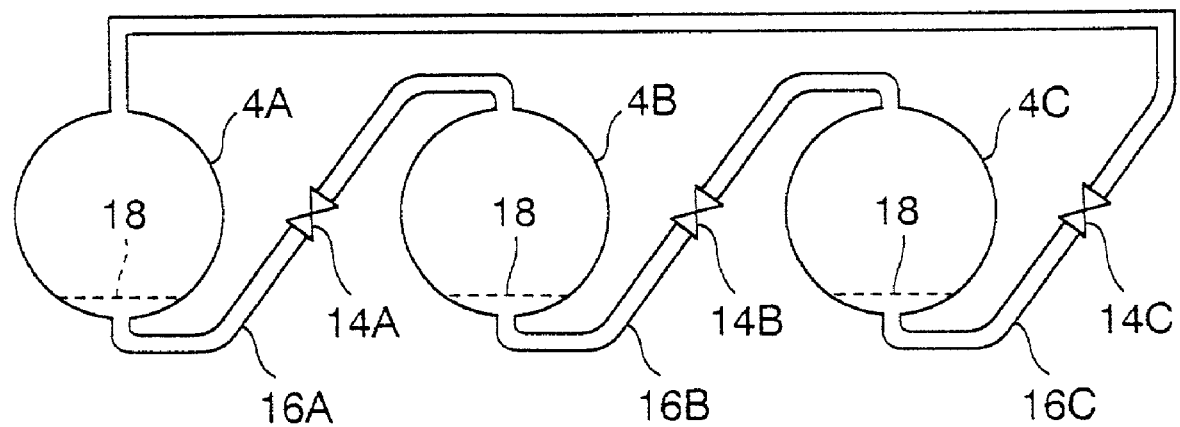
FIG. 5 is a schematic constitutional view illustrating a second embodiment of a high temperature high pressure underwater curing apparatus for concrete molding products according to this invention.

As described above, in this embodiment, an embodiment of connecting the two pressure resistant vessels by the two transfer pipes so as to form a circulation channel with each other has been explained for the sake of convenience of the explanation. However, the number of the pressure resistant vessels to be connected is not restricted only thereto but it may be optional so long as they are two or more. As an example, a second embodiment according to this invention using three pressure resistant vessels is to be described with reference to FIG. 5 on the portions different from those of the first embodiment while depicting the same members as those in the first embodiment with identical reference numerals.

As illustrated, identical pressure resistant vessels with those of the first embodiment are used by the number of three, in which a transfer pipe 16A on the delivery side of curing water in communication with an upper portion of the second pressure resistant vessel 4B (receiving side of the pressure resistant vessel 4B) to a lower portion of the first pressure resistant vessel 4A by way of an ON/OFF valve 14A. In the same manner, a transfer pipe 16B on the delivery side of curing water in communication with an upper portion of the third pressure resistant vessel 4C (receiving side of the pressure resistant vessel 4C) to a lower portion of the second pressure resistant vessel 4B by way of an ON/OFF valve 14B. Further in the same manner, a transfer pipe 16C on the delivery side of curing water in communication with an upper portion of the first pressure resistant vessel 4A (receiving side of the pressure resistant vessel 4A) to a lower portion of the third pressure resistant vessel 4C by way of an ON/OFF valve 14C. Accordingly, the three pressure resistant vessels 4A, 4B and 4C are connected to each other via the three transfer pipes 16A, 16B and 16C so as to form a circulation channel.

Referring to the curing method using this high temperature high pressure underwater curing apparatus, high temperature high pressure underwater curing (curing step) is started in the second pressure resistant vessel 4B in accordance with the same procedures as above, and then high temperature high pressure underwater curing (curing step) is started also in the first pressure resistant vessel 4A in accordance with the same procedures. The third pressure resistant vessel 4C is caused to stand-by in a state of tightly sealing the inside while containing and arranging concrete molding products (stand-by step).

Subsequently, soon after the completion of the curing step in the second pressure resistant vessel 4B, in accordance with the same procedures as the first embodiment, high temperature high pressure curing water in the second pressure resistant vessel 4B is transferred to the third pressure resistant vessel 4C (transfer step) and high temperature high pressure underwater curing step is conducted in the third pressure resistant vessel 4C. Subsequently, when after the temperature of the second pressure resistant vessel 4B is lowered, the concrete molding products at the inside are replaced with concrete molding products to be cured and the inside is put to a sealed state for stand-by (stand-by step).

Then, soon after the completion of the curing step in the first pressure resistant vessel 4A, the high temperature high pressure curing water is transferred to the second pressure resistant vessel 4B (transfer step), and curing is started in the second pressure resistant vessel 4B and concrete molding products in the first pressure resistant vessel 4A are replaced to enter the stand-by state (stand-by step). Subsequently, the operations in each of the steps are repeated successively while being shifted on each of the pressure resistant vessels 4A, 4B and 4C, to conduct curing for concrete molding products while transferring the high temperature high pressure curing water to three pressure resistant vessels 4A, 4B and 4C connected so as to form a circulation channel.

In the high temperature high pressure underwater curing apparatus for concrete molding products, and the curing method using the apparatus shown in the second embodiment, since the starting time for the curing step conducted in each of the pressure resistant vessels 4A, 4B and 4C is shifted such that at least one pressure resistant vessel is always in the stand-by step, the curing water in the pressure resistant vessel in which the curing step has been completed is instantly transferred to the pressure resistant vessel in the stand-by step to transfer to the curing step thereby capable of reducing the stand-by time in the stand-by step, more concrete molding products can be cured at a high working efficiency and in a short period of time to improve the production efficiency.

INDUSTRIAL APPLICABILITY

As has been explained specifically above, by manufacturing chemically prestressed concrete molding products using the manufacturing method according to this invention, high strength components with increased amount of chemical prestress introduced thereto and with smaller loss of the chemical prestress can be obtained compared with those obtained from other curing methods using identical formulations.

Further, compared with existent autoclave curing, a large expansion strain and compressive stress can be obtained at a lower curing temperature and in a shorter retention time.

Then, since cement hardening is remarkably promoted, a predetermined compressive strength can be obtained in a short period of time.

Further, since predetermined chemical prestress can be introduced, it can provide an effect capable of reducing the amount of the expansive additive to be used.

Further, the high temperature high pressure underwater curing apparatus, and the curing method using the apparatus for the concrete molding products according to this invention provide the following excellent effects.

A plurality of pressure resistant vessels are connected so as to form a circulation channel to each other, and each of the pressure resistant vessels can be used respectively as independent curing apparatus by closing all ON/OFF valves, and they can be communicated to each other by opening the ON/OFF valves.

High temperature and high pressure curing water stored inside the pressure resistant vessel can easily be transferred to other pressure resistant vessel at a normal pressure by merely opening the ON/OFF valve.

Since, once used high temperature high pressure curing water can be re-used by transferring and circulating the same successively between a plurality of pressure resistant vessels, a great amount of water can be saved and the labor for heating and heat energy therefore can also be saved remarkably, so that highly efficient curing can be conducted both in view of time and energy consumption compared with a case of filling the inside of the pressure resistant vessel with water or warmed water as fresh curing water on every replacement of concrete molding products.

Since high temperature high pressure curing water can be transferred merely by the operation of opening the ON/OFF valve and high temperature curing water is not discharged to the outside, the operation safety can be improved outstandingly.

High temperature high pressure curing water in the pressure resistant vessel after the completion of the curing step can be transferred by merely opening the ON/OFF valve of the transfer pipe into the pressure resistant vessel in the stand-by step at a normal pressure till their inner pressures are in an equilibrium state, whereby the ON/OFF valve for the deaeration device of the pressure resistant vessel on the receiving side in the stand-by step is opened thereby capable of transferring a great amount of water as much as possible while utmost utilizing the inner pressure in the pressure resistant vessel after the completion of the curing step on the delivery side and, further, the curing water remaining in the pressure resistant vessel after the completion of the curing step on the delivery side can be easily transferred substantially for the entire amount into the other pressure resistant vessel in the stand-by step by supplying pressurized air from the pressurized air supply device disposed to the pressure resistant vessel after completion of the curing to the inside thereof.

Further, when the transfer pipe is connected to the upper portion of the pressure resistant vessel on the receiving side to which the pipe is connected, curing water can be transferred with no effect of the pressure caused by the weight of the already transferred curing water in the pressure resistant vessel on the receiving side, whereby the load exerted on the pressurized air supply device of the pressure resistant vessel on the delivery side can be decreased, the transfer time can be shortened and the operation time for the pressurized air supply device can be shortened, so that curing water can be transferred efficiently while reducing the energy consumption of the pressurized air supply device.

The high temperature high pressure underwater curing apparatus according to this invention can be obtained at an extremely reduced cost and easily with no enormous installation instrument in a simple structure of merely using a plurality of existent pressure resistant vessels and connecting them by way of ON/OFF valves to each other by curing water transfer pipes so as to form a circulation channel to each other.

Since high temperature high pressure curing water in the pressure resistant vessel in which the curing step has been completed can successively be transferred to the pressure resistant vessel in the stand-by step to repeat curing by shifting the step in each of the pressure resistant vessels, loss of heat energy can be reduced greatly and curing operation can be conducted at an extremely high efficiency both in view of energy and time.

The invention claimed is:

1. A high temperature high pressure underwater curing apparatus for concrete molding products in high temperature high pressure curing water sealed in a pressure resistant vessel comprising a plurality of openable/closable pressure resistant vessels for containing concrete molding products, each of the pressure resistance vessels comprising:
   a curing water supply device for supplying water or warmed water as curing water to the inside of the vessel;
   a pressurized air supply device for supplying pressurized air to the inside of the vessel thereby pressurizing the inside curing water;
   a heater for heating the curing water supplied to the inside of the vessel and maintaining the same at a predetermined temperature; and
   a deaeration valve disposed to an upper portion of the vessel for opening the inside to atmospheric air, wherein
   a transfer pipe is disposed to a lower portion of each vessel being connected to an optional portion of other pressure resistant vessel for delivering curing water in communication with other pressure resistant vessel by way of an ON/OFF valve,
   a transfer pipe is disposed to the optional portion of each vessel being connected to the lower portion of other pressure resistant vessel and receiving curing water in communication with the other pressure resistant vessel by way of an ON/OFF valve, and
   the respective pressure resistant vessels are connected by the two transfer pipes so as to form a circulation channel to each other.

2. A high temperature high pressure underwater curing apparatus for concrete molding products as claimed in claim 1,
   wherein the transfer pipe on the receiving side for the curing water is disposed being situated to an upper portion of each pressure resistant vessel.

3. A method of curing concrete molding products using a high temperature high pressure underwater curing apparatus comprising:
   a curing step of filling the inside of a pressure resistant vessel with curing water, keeping the curing water at a predetermined high temperature by a heater and supplying pressurized air from a pressurized air supply device to put the inside of the pressure resistant vessel to a high pressure and curing concrete molding products contained in the vessel for a predetermined period of time;
   a transfer step for curing water of opening an ON/OFF valve of a transfer pipe on the delivery side of the pressure resistant vessel, transferring high temperature high pressure curing water filled inside the pressure resistant vessel through the transfer pipe on the delivery side to other pressure resistant vessel and closing the ON/OFF valve of the transfer pipe on the delivery side after the completion of transfer of the curing water, wherein the transfer pipe is disposed to a lower portion of each vessel being connected to an optional portion of other pressure resistant vessel for delivering curing water, the transfer pipe is disposed to the optional portion of each vessel being connected to the lower portion of other pressure resistant vessel for receiving curing water; and
   a stand-by step of taking out the concrete molding products after curing from the inside after the completion of the transfer step, replacing the same with concrete molding products before curing and waiting for reception of curing water from other pressure resistant vessel, in which
   each of the steps is repeated successively being shifted on each of the pressure resistant vessels and concrete molding products are cured while transferring the curing water to a plurality of the pressure resistant vessels connected so as to form a circulation channel.

4. A method of curing concrete molding products using the high temperature high pressure underwater curing apparatus as claimed in claim 3,
   wherein the inside of the other pressure resistant vessel is opened to atmospheric air by a deaeration valve in the transfer step for curing water.

5. A method of curing concrete molding products using the high temperature high pressure underwater curing apparatus as claimed in claim 4,
   wherein pressurized air is supplied from the pressurized air supply device of the pressure resistant vessel in which the curing step has been completed and curing water remaining inside is forcedly transferred to the other pressure resistant vessel.

6. A method of curing concrete molding products using the high temperature high pressure underwater curing apparatus as claimed in claim 3,
   wherein pressurized air is supplied from the pressurized air supply device of the pressure resistant vessel in which the curing step has been completed and curing water remaining inside is forcedly transferred to the other pressure resistant vessel.

7. A method of curing concrete molding products using the high temperature high pressure underwater curing apparatus comprising:
   a curing step of filling the inside of a pressure resistant vessel with curing water, keeping the curing water at a predetermined high temperature by a heater and supplying pressurized air from a pressurized air supply device to put the inside of the pressure resistant vessel to a high pressure and curing concrete molding products contained in the vessel for a predetermined period of time;
   a transfer step for curing water of opening an ON/OFF valve of a transfer pipe on the delivery side of the pressure resistant vessel, transferring high temperature high pressure curing water filled inside the pressure resistant vessel through the transfer pipe on the delivery side to other pressure resistant vessel and closing the ON/OFF valve of the transfer pipe on the delivery side after the completion of transfer of the curing water, wherein the transfer pipe is disposed to a lower portion of each vessel being connected to an optional portion of other pressure resistant vessel for delivering curing water, the transfer pipe is disposed to the optional portion of each vessel being connected to the lower portion of other pressure resistant vessel for receiving curing water; and
   a stand-by step of taking out the concrete molding products after curing from the inside after the completion of the transfer step, replacing the same with concrete molding products before curing and waiting for reception of curing water from other pressure resistant vessel, in which
   each of the steps is repeated successively being shifted on each of the pressure resistant vessels and concrete molding products are cured while transferring the curing water to a plurality of the pressure resistant vessels connected so as to form a circulation channel.

8. A method of curing concrete molding products using the high temperature high pressure underwater curing apparatus as claimed in claim 7, wherein the inside of the other pressure resistant vessel is opened to atmospheric air by a deaeration valve in the transfer stop for the curing water.

9. A method of curing concrete molding products using the high temperature high pressure underwater curing apparatus as claimed in claim 8, wherein pressurized air is supplied from the pressurized air supply device of the pressure resistant vessel in which the curing step has been completed and curing water remaining inside is forcedly transferred to the other pressure resistant vessel.

10. A method of curing concrete molding products using the high temperature high pressure underwater curing apparatus as claimed in claim 7, wherein pressurized air is supplied from the pressurized air supply device of the pressure resistant vessel in which the curing step has been completed and curing water remaining inside is forcedly transferred to the other pressure resistant vessel.

11. A high temperature high pressure underwater curing apparatus comprising:

a plurality of pressure resistant vessels, each of the plurality of pressure resistant vessels comprising a curing water supply device, a heater, a deaeration valve, a first transfer pipe disposed to a lower portion of each vessel in communication with other pressure resistant vessel for delivering curing water, a second transfer pipe in communication with the lower portion of other pressure resistant vessel for receiving curing water, the first transfer pipe and the second transfer pipe forming a circulation channel between the respective pressure resistant vessels.

12. A method of curing concrete molding products using a high temperature high pressure underwater curing apparatus comprising:

filling a pressure resistant vessel of a plurality of pressure resistant vessels with curing water supplying pressurized air to the pressurized resistant vessel curing a concrete molding product contained in the pressure resistant vessel transferring high temperature high pressure curing water through from the pressure resistant vessel through a circulation channel formed by a transfer pipe included with each of the pressure resistant vessels to other pressure resistant vessel removing the concrete molding product after completion of the transferring successively repeating the filing, the supplying, the curing, the transferring, and the removing in each of the pressure resistant vessels to cure concrete molding products while transferring the curing water between pressure resistant vessels via the circulation channel.

\* \* \* \* \*